(12) United States Patent
Dirkse et al.

(10) Patent No.: US 6,569,317 B1
(45) Date of Patent: May 27, 2003

(54) TRICKLE VALVE

(75) Inventors: Hendricus Arien Dirkse, Amsterdam (NL); Hubertus Wilhelmus Albertus Dries, Amsterdam (NL); Willem Rozema, The Hague (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/500,490

(22) Filed: Feb. 9, 2000

(30) Foreign Application Priority Data

Jul. 9, 1999 (EP) .............................. 99305463

(51) Int. Cl.7 .............................. B04C 5/15; B01J 8/24; C10G 35/14
(52) U.S. Cl. .................. 208/163; 208/164; 422/212; 422/213; 422/214; 382/527.8
(58) Field of Search ................. 382/537.8; 422/211, 422/212, 213, 214; 208/163, 164

(56) References Cited

U.S. PATENT DOCUMENTS

| 3,814,377 A | * | 6/1974 | Todd | 251/145 |
|---|---|---|---|---|
| 4,074,691 A | * | 2/1978 | Luckenbach | 137/382 |
| 4,220,623 A | * | 9/1980 | Jahnke et al. | 422/144 |
| 4,448,753 A | * | 5/1984 | Gross et al. | 422/144 |
| 4,711,712 A | * | 12/1987 | Schatz | 208/153 |
| 4,749,471 A | * | 6/1988 | Kam et al. | 208/113 |
| 5,037,617 A | * | 8/1991 | Soni | 422/144 |
| 5,059,305 A | * | 10/1991 | Sapre | |
| 5,101,855 A | | 4/1992 | Tammera | |
| 5,141,644 A | * | 8/1992 | Forde | 208/113 |
| 5,740,834 A | | 4/1998 | Sherowski | |

FOREIGN PATENT DOCUMENTS

WO 97/24412 10/1997

* cited by examiner

Primary Examiner—Bekir L. Yildirim

(57) ABSTRACT

An apparatus comprising a trickle valve positioned at the lower end of a vertical dipleg of a gas-solids separator comprising a pair of co-operable clamshell doors arranged in such a manner that mutual opposite swinging movement between a closed position wherein the doors adjoin along a midline, and an open position wherein the doors swing outwardly around a horizontal axis of rotation, is possible, and wherein either clamshell door is provided with means to press the doors together towards a closed position and at least one clamshell door is provided with an opening.

6 Claims, 2 Drawing Sheets

TRICKLE VALVE

BACKGROUND OF THE INVENTION

There are many processes in the petroleum refinery and other chemical process areas which utilize equipment for separating fine solid particles from a fluidizing or other gas and for separating fine solid particles from larger particles. One example of such a process is the fluid catalytic cracking (FCC) process, for producing primarily liquid petroleum fuel products from heavy gas oils. The desire reaction takes place when preheated gas oil feed is brought into contact with a hot cracking catalyst which is in the form of a fine powder, typically having a particle size of from about 10–200 microns, usually a mean particle size of about 70–100 microns. The catalyst particles are typically contacted with the hydrocarbon feedstock in a dilute phase fluidized bed as the reaction zone. The effluent of the reaction zone is a mixture of a cracked vapor product and coked catalyst particles. The coked catalyst particles are separated from cracked vapor product by means of two or more cyclone separators in series. The first cyclone separator is generally referred to as the primary cyclone. The gaseous effluent of the primary cyclone is typically fed to a so-called secondary cyclone in which the cracked vapor is further separated from the coked catalyst. The catalyst may be separated from the effluent of a reactor zone by means of more than one combination of primary and secondary cyclones operating in parallel. The separated coked catalyst particles are fed into a stripping zone via diplegs protruding down from the primary and secondary cyclones. The stripping zone is typically a dense fluidized bed to which a stripping medium is supplied to as fluidizing means. The stripped catalyst particles are then sent to a regenerating zone in which the coke is burned off with an oxygen-containing gas, typically air, to form regenerated catalyst particles. The regenerated catalyst is returned to the reactor zone where they contact fresh feed.

A practical situation encountered with primary cyclones used in a FCC operation is that, due to the over pressure inside the cyclone relative to the reactor zone, cracked vapor can escape down via the dipleg into the stripping zone. This is disadvantageous because these gasses give rise to coke formation in this zone and furthermore it is negatively affecting the overall product yield. A conventional solution to overcome this problem is to submerge the lower end of the dipleg in the dense fluidized bed of the stripping zone, wherein optionally under the lower dipleg opening a horizontal plate, also referred to as dollar plate, is placed. In the event of a pressure surge hydrocarbon product gasses will not escape via the dipleg because of the presence of the dense fluidized bed in the lower part of the dipleg and because of the restricted opening between the dipleg opening and the dollar plate. It is however not always possible, for example because of geometrical restrictions, to submerge the dipleg of the primary cyclone in a dense phase stripping bed. An alternative is that the lower discharge end of the primary cyclone is located above the bed level of the dense phase fluidized bed and a valve or seal is present at said discharge end. The valve or seal will ensure that a sufficient column of catalyst is present in the dipleg which prevents hydrocarbon gasses from escaping via the dipleg into the stripping zone. A problem associated with valves and seals as means to prevent hydrocarbons escaping into the stripping zone via a primary cyclone dipleg is that their unreliability, due to mechanical failure or to clogging as a result of the high catalyst flow through the dipleg. Typically between 5 and 50 kilotons of catalyst are discharged daily through a dipleg of a primary cyclone. In contrast only between 5 and 1000 tons are discharged daily through a dipleg of a secondary cyclone. In a normal FCC operation such valves have to operate for at least three years without failure and present designs tend to fail during such a prolonged period of time. For example trickle valve designs which are found to be very suitable for use as a valve under a dipleg of a secondary cyclone do not, as a rule, provide a reliable design which is suitable for a primary cyclone. There is thus a need for a reliable valve design which can be used at the discharge end of a primary cyclone dipleg of a FCC unit operation. The present invention provides such a valve.

Prior art valves are for example described in WO-A-9724412, U.S. Pat. No. 5,101,855, U.S. Pat. No. 4,871,514 and U.S. Pat. No. 5,740,834 and GB-A-2212248. Prior art seals are for example described in U.S. Pat. No. 4502947.

SUMMARY OF THE INVENTION

Trickle valve positioned at the lower end of a vertical dipleg of a gas-solids separator comprising a pair of co-operable clamshell doors arranged in such a manner that mutual opposite swinging movement between a closed position wherein the doors adjoin along a midline, and an open position wherein the doors swing outwardly around a horizontal axis of rotation, is possible, and wherein either clamshell door is provided with means to press the doors together towards a closed position and at least one clamshell door is provided with an opening.

The trickle valve according to the invention has proven to be operational reliable, erosion-resistant and fouling resistant for at least 3 years and even up to 5 years.

The clamshell doors of the trickle valve are able to close, apart from the opening in at least one door, the lower end of the dipleg. The lower end of the dipleg is suitably a horizontal cut-off of the tubular dipleg forming a valve seat. When not in use the clamshell doors will be in a closed position wherein the doors are adjoined along a midline. This midline is suitably parallel to the axis of rotation of the clamshell doors. It has been found that it is important that a certain force is put onto the clamshell doors to press the doors together towards the closed position. The opening and closing of the clamshell doors depends on the weight of the particles and gas pressure inside the dipleg and the gas pressure outside the dipleg. Because of the force pressing the doors towards the closed position the doors will only slightly open when the cyclone is in use resulting in that a certain pressure will have to be overcome by the catalyst particles when being discharged from the dipleg. This is advantageous because it ensures that a more constant flow of catalyst is discharged from the dipleg, resulting in less frequent movement of the valve, which results in less mechanical wear of the valve. A further result is that cracked vapor is less likely to escape via the dipleg due to the column of catalyst particles present in the lower end of the dipleg.

The means to press the doors together are suitably counterweights, which counterweight is suitably part of the clamshell door extending away outwardly with respect to the longitudinal axis of the dipleg and the axis of rotation. The force to be supplied by the counterweights is preferably sufficient to enable the doors to open, when in use, to a sufficient opening area. This force can easily be determined for every individual situation by one skilled in the art.

It has also been found that the presence of an opening in at least one of the clamshell doors and preferably in both doors is essential in achieving a smooth discharge of catalyst particles from the lower end of the dipleg, especially in a start-up situation. In use it has been observed that catalyst will flow through the openings in the clamshell doors and through the small slit-like opening provided along the midline of the partly opened doors. It is believed that the resulting three catalyst flows stabilize the clamshell doors preventing them to frequently close and open. The clamshell doors are preferably symmetrical towards each other. The openings are suitably provided near the axis of rotation of the clamshell doors. The area of an opening in one door may suitably be between 2 and 10% of the cross-sectional area of the dipleg.

DETAILED DESCRIPTION OF THE INVENTION

The gas-solids separator may be any separator which can be used for separating large quantities of solids from a gaseous stream and which is equipped with a dipleg. With dipleg is here meant a vertical-positioned elongated tube-like element which is fluidly connected at the upper end to a solids outlet of the gas solids separator and has an opening at the lower end to discharge the solids passing through the dipleg. The gas-solids separator is suitably a cyclone separator. Examples of a so-called horizontal cyclone separator having a dipleg is described in EP-A-332277. Typically, the cyclone separator will be of the vertical type of which examples are described in WO-A-972358, U.S. Pat. No. 3,661,799, U.S. Pat. No. 4,502,947 AND U.S. Pat. No. 5,039,397.

The invention is also related to a fluid catalytic cracking process unit comprising a dilute phase fluidized bed as a reaction zone having an outlet fluidly connected to a primary gas solids separator comprising a dipleg and the trickle valve according to the invention as here described, secondary gas-solids separation means to separate the catalyst particles still present in the cracked vapor leaving the primary gas-solids separation means, a dense phase fluidized bed as a stripping zone to which the thus separated catalyst can be discharged to form the gas-solids separation means and wherein the trickle valve is positioned above the bed level of the dense phase fluidized bed and a regenerating zone in which coke can be removed from the stripped catalyst particles and means to feed the regenerated catalyst to the reaction zone. Suitable embodiments of dilute phase fluidized bed, primary, secondary gas-solids separators, stripping zones and regeneration zones are well known to one skilled in the art and are for example described in the introductory part of this description and in the above-mentioned patent publications EP-A-332277, WO-A-972358, U.S. Pat. No. 3,661,799, U.S. Pat. No. 4,502,947 and U.S. Pat. No. 5,039,397.

For the sake of convenience, the invention is described below in particular detail with respect to a fluidized bed reactor containing a single vertically positioned primary and secondary cyclone, wherein the primary cyclone has dipleg at the bottom of which terminates in a trickle valve according to the invention.

Figure 1:
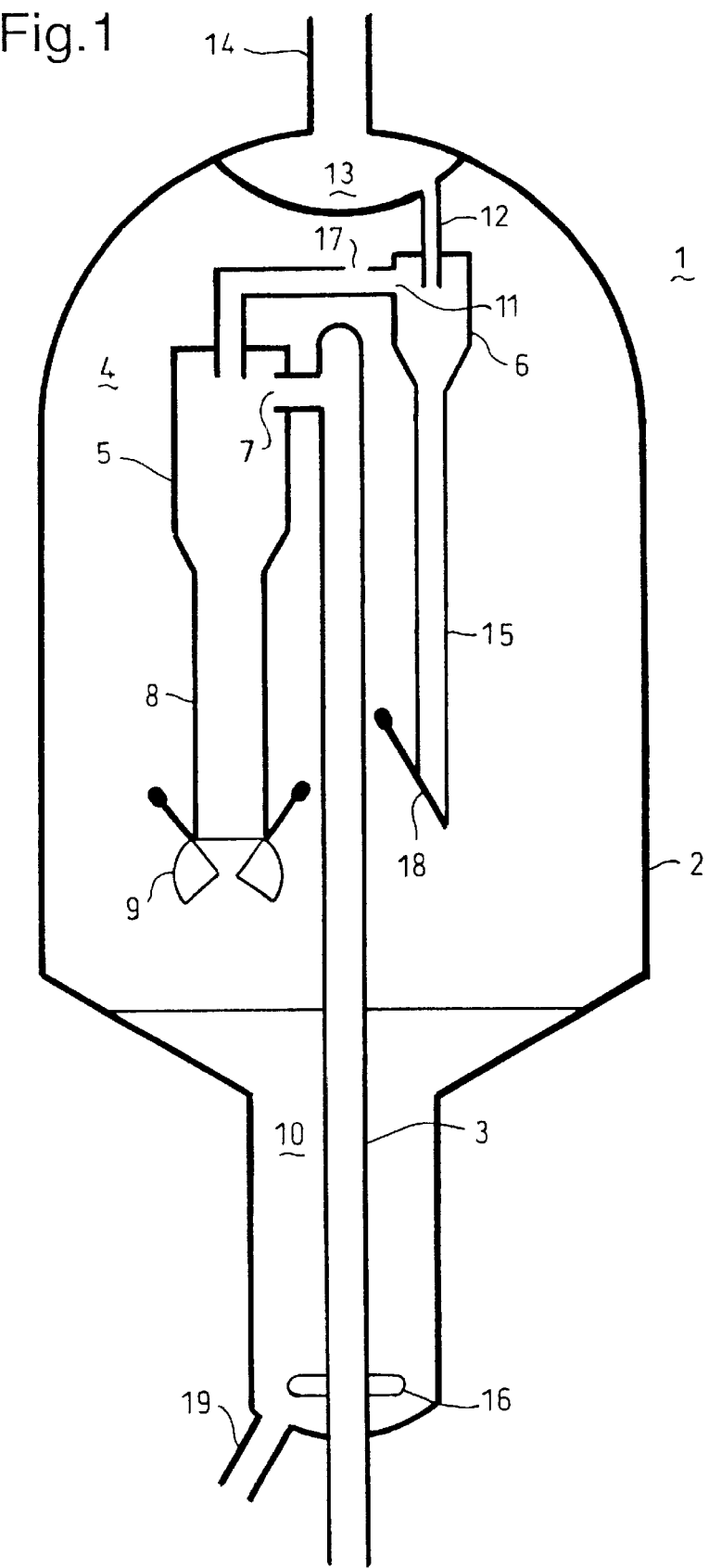
FIG. 1 is a vertical section of a vessel having a primary and a secondary cyclone separator positioned within the vessel to which the trickle valve of the invention is attached.

Referring to FIG. 1, a fluid solids contacting vessel roughly depicted as a fluidized bed catalyst cracking unit 1 includes an outer shell 2 which is provided with a riser 3 in which vaporized hydrocarbons are cracked by contact with hot, fluidized catalyst particles suspended in the hydrocarbon vapor or gas. The mixture of hot hydrocarbon vapor and fluidized catalyst particles are introduced into the reactor vessel at a position within the upper or disengaging zone of vessel 4 which contains a plurality of primary and secondary cyclones for separating the particles from the vapor, of which only one of each, 5 and 6, are shown for convenience. The catalyst particles and hot hydrocarbon vapor enter a primary cyclone 5 via entrance 7 for primary separation of the hydrocarbon vapor and catalyst particles. In the primary cyclone 5 most of the catalyst particles, but not all, are separated from the hydrocarbon vapor and pass into dipleg 8, exiting the dipleg 8 via trickle valve 9 and then falling into stripping zone 10 below. The vapor exiting from the primary cyclones still contain some catalyst particles and are fed to secondary cyclones, of which cyclone 6 is but an illustrative, but non-limiting example. Thus, the hydrocarbon product vapor containing the remaining particles enter secondary cyclone 6 via entrance 11 from which the vapor exit via conduit 12 into plenum 13 and then out through conduit 14. The catalyst particles which are separated from the product vapor in secondary cyclone 6 and are still in a fluidized state are fed via dipleg 15 into spent catalyst stripping zone 10 below. A stripping gas such as steam is introduced near the bottom of the unit via line 16 and strips remaining vaporizable hydrocarbon liquids off the spent catalyst particles to produce additional hydrocarbon vapor and steam which is discharged with the cracked hydrocarbon vapor via slit 17. Trickle valve 18 is located at the bottom of dipleg 15 of the secondary cyclone 6. The spent catalyst particles in zone 10 are in a fluidized state and are removed from the cracking unit via line 19 from where they are sent to the catalyst regenerator (not shown). Trickle valve 9 is a trickle valve according to the invention and is described in detail below.

Figure 2A:
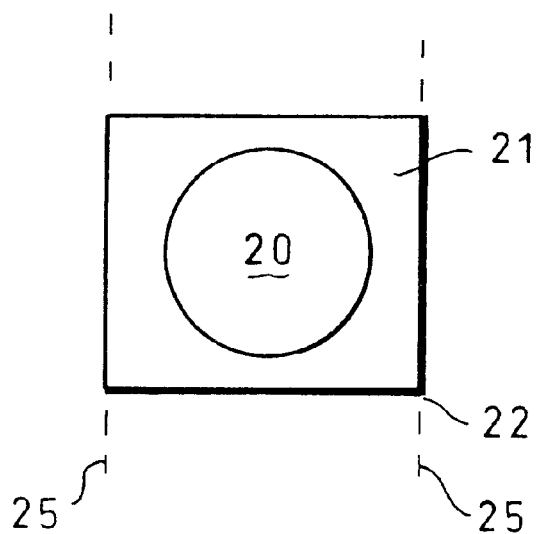
FIGS. 2(a), (b) and (c) schematically illustrate side and front views of a trickle valve of the invention.
Figure 2B:
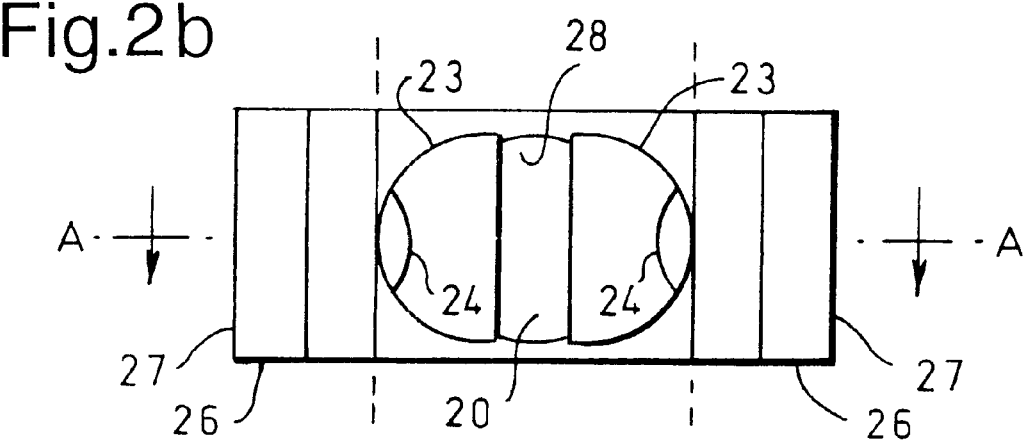
Figure 2C:
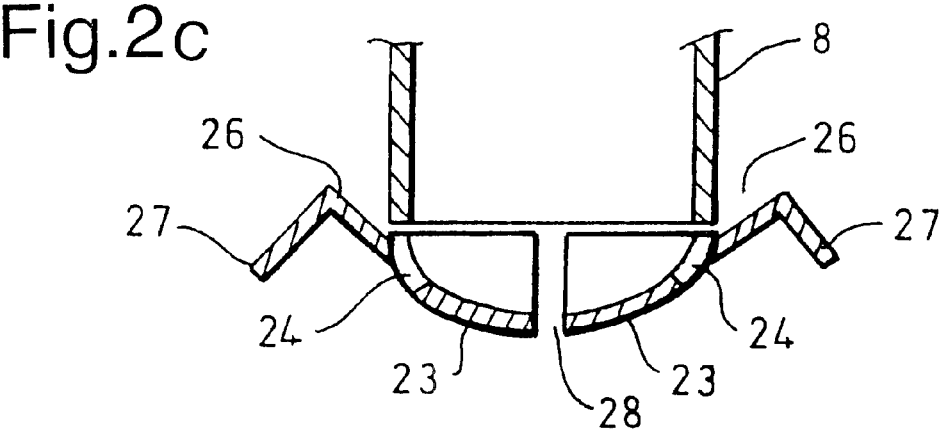

Turning now to FIG. 2, FIG. 2(a) represents a view, from below, of the valve seat at the discharge end of the primary dipleg without showing the trickle valve according to the invention. FIG. 2(b) schematically illustrates a view from below of a partly opened trickle valve according to the invention mounted on the valve seat of FIG. 2(a). FIG. 2(c) is a cross-sectional representation of the trickle valve along line AA' of FIG. 2(b).

FIG. 2(a) shows a valve seat 21 and means 22 to attach the clamshell doors in such a manner that a rotating movement is possible along line 25. In FIG. 2(a) the interior 20 of the primary dipleg 8 is also shown.

FIGS. 2(b) and 2(c) show two clamshell doors 23 having an opening 24, and arms 26 extending outwards from the dipleg ending in a counterweight 27. In FIG. 2(b) a slit 28 is furthermore shown which enables one to see part of the interior 20 of dipleg 8.

The invention shall be illustrated by the following non-limiting examples.

EXAMPLE 1

Through a vertical tubular pipe having a diameter of 0.2 m a downward moving catalyst stream of 500 ton/day was discharged via a trickle valve according to the invention and as illustrated in FIGS. 2 and 2(a). The counterweights were so chosen that, during operating, the opening between the two symmetrical clamshell doors and the valve seat was about 3 degrees. The openings made in the doors had a total area of 15 mm$^2$ and the area formed by all the slits was, during operation 60 cm$^2$. The powder used was fresh full range FCC-catalyst. The trickle valve operated during 1 hour without any problems. Catalyst flows were observed via the openings in the doors and via the slit formed between the doors along the midline. The test was successfully repeated with consideration for start-up, shut-down and re-start and also successful carried out with a slugging catalyst flow.

COMPARATIVE EXPERIMENT

Example 1 was repeated except that the clamshell doors were not provided with openings. The result was similar once the flow was established. It was however not at all time possible to create sufficient down flow of catalyst through the dipleg-valve, so that flooding of the dipleg occurred during start-up. In a commercial unit this would have resulted in that the start-up was not successful, resulting in additional downtime. Reliable start of the flow as only achieved by aeration of the dipleg-bottom; however this is not a practical solution.

COMMERCIAL EXAMPLE

The device described in Example 1 was tested at commercial scale in a FCC-reactor, when scaled up and added to a first-state-separator dipleg of 0.8 m diameter, discharging 20 kilotons per day of catalyst. The device experienced an un-interrupted operational run of 3 years and remained in operation thereafter.

What is claimed is:

1. An apparatus comprising a trickle valve positioned at the lower end of a vertical dipleg of a gas-solids separator comprising a pair of co-operable clamshell doors arranged in such a manner that mutual opposite swinging movement between a closed position wherein the doors adjoin along a midline, and an open position wherein the doors swing outwardly around a horizontal axis of rotation, is possible, and wherein either clamshell door is provided with means to press the doors together towards a closed position and at least one clamshell door is provided with an opening.

2. The apparatus according to claim 1, wherein both clamshell doors are provided with an opening.

3. The apparatus according to claim 2, wherein the area of the openings in the clamshell doors is between 2–10% of the cross-sectional area of the dipleg.

4. The apparatus according to claim 3, wherein the means to press the doors together are counterweights extending away outwardly with respect to the longitudinal axis of the dipleg and away from the axis of rotation.

5. A fluid catalytic cracking process unit comprising a dilute phase fluidized bed as a reaction zone which reaction zone has an outlet which is fluidly connected to a primary gas solids separator comprising a dipleg and the trickle valve according to claim 1 secondary gas-solids separation means to separate the catalyst particles still present in the cracked vapor leaving the primary gas-solids separation means, a dense phase fluidized bed as a stripping zone to which the thus separated catalyst can be discharged to form the gaseous solids separation means and wherein the trickle valve is positioned above the bed level of the dense phase fluidized bed and a regenerating zone in which coke can be removed from the stripped catalyst particles and means to feed the regenerated catalyst to the reaction zone.

6. A fluidized catalytic cracking process comprising:
    mixing hydrocarbon vapor and fluidized catalyst particles in the apparatus of claim 5 wherein the flow of catalysts being discharged by the trickle valve is between 5–50 kilotons per day.

\* \* \* \* \*